United States Patent [19]

Namikawa et al.

[11] 3,784,796

[45] Jan. 8, 1974

[54] MAGNETIC CARD

[75] Inventors: Mamoru Namikawa; Kaneyoshi Arai, both of Tokyo, Japan

[73] Assignee: Tokyo Magnetic Printing Company, Ltd., Tokyo, Japan

[22] Filed: Mar. 28, 1972

[21] Appl. No.: 238,832

[52] U.S. Cl. .... 235/61.12 M, 179/100.2 A, 274/4 J

[51] Int. Cl. .......................... G06k 19/04, G11b 5/80

[58] Field of Search ....................... 235/61.12, 61.11; 340/174.1 C; 235/61.7 B; 179/100.2 A; 346/74 MP; 274/4 J

[56] References Cited

UNITED STATES PATENTS

| | | | |
|---|---|---|---|
| 2,677,200 | 5/1954 | MacChesney | 346/74 MP |
| 2,710,191 | 6/1955 | Williams | 274/4 J |
| 3,109,749 | 11/1963 | DiRicco | 179/100.2 A |
| 3,238,842 | 3/1966 | Wiklund et al. | 274/4 J |
| 3,406,382 | 10/1968 | Wilmer | 340/174.1 C |
| 3,117,065 | 1/1964 | Wootten | 235/61.12 M |
| 3,221,304 | 11/1965 | Enikeieff et al. | 235/61.7 B |

OTHER PUBLICATIONS

IBM Technical Discl. Bulletin Brackett et al., "Record With Flush Magnetic Stripe," p. 92, Vol. 13, No. 1, 6/1970.

IBM Technical Discl. Bulletin Treseder et al., "Identification Card & Transport Mechanism," p. 1000, 1001, Vol. 10, No. 7, 12/1967.

IBM Tech. Discl. Bulletin Staats, "Punchable - Card," Vol. 2, No. 4, December, 1959, pp. 104,105.

*Primary Examiner*—Thomas J. Sloyan
*Attorney*—Staas, Halsey & Gable

[57] ABSTRACT

A magnetic card having modified edges is disclosed having a magnetic layer on at least a part of a substrate. The magnetic layer has a surface formed without pronounced edges on the peripheral portions of the magnetic layer. Illustratively, the peripheral portions of the magnetic layer are inclined or curved surfaces. Thus, the magnetic card can move smoothly across a gap surface of a magnetic head.

2 Claims, 10 Drawing Figures

MAGNETIC CARD

BACKGROUND OF THE INVENTION

1. Field of the Invention

This invention relates to storage media and in particular, to a card having a layer or surface of a magnetic material.

2. Description of the Prior Art

Magnetic cards have found application as commutation tickets for automatic examining, credit cards, cash cards in banks, etc. The input signals indicative of coded names, expiration dates, validation codes, amount of money, etc., are recorded on the magnetic layer of these cards by a magnetic head with such recording modes as return-to-bias, NRZI, FM method, etc. The recorded signals may be read out to initiate a bank deposit, to check account credit, to make purchases, to identify the card holder, and as a magnetic key to facilitate entry into a security area. Further, magnetic cards may be used as stock level control cards for warehouse management or as a part of a data bank system or a manpower saving system.

Heretofore, the methods of forming a layer of a magnetic recording substance on a card include (1) painting, (2) vapor deposition, (3) attaching by use of a bonding or adhesive agent. Those methods were generally used to form the magnetic recording substances only on the necessary parts of the magnetic card.

FIGS. 1A, 1B, 2A and 2B indicate the structure of prior art magnetic cards. In FIGS. 1A and 1B, a substrate 1 made of such materials as vinylchloride resin, other synthetic resin, or paper, provide a base for receiving a magnetic layer 2. The magnetic layer 2 of FIG. 1A is formed as a narrow strip, but it may be formed over the entire surface of the substrate 1. FIG. 1B is a cross-sectional view taken along line A–A′ of the magnetic card of FIG. 1A.

This magnetic card, however, has the following defects: (1) the thickness of the composite card is increased by the thickness of the layer of the magnetic substance, and therefore, the peripheral portions 3 of the magnetic recording substances are damaged by contact with the magnetic head, and (2) before a bonding agent becomes completely solid, the layer of the magnetic recording substance may slip, thus making it difficult to record signals on the misplaced layer.

FIGS. 2A and 2B indicate other structures of a magnetic card. In FIG. 2A, a substrate 21 is made of synthetic resin material such as hard vinylchloride or paper and a groove is provided therein for receiving the magnetic layer 22. The surface of the magnetic layer 22 is disposed within the plane of the substrate 21 and the edge 23 of the layer 22 does not protrude from the substrate 21. FIG. 2B is a cross-sectional view taken along line II*b*—II*b* of FIG. 2A.

Prior art magnetic cards have pronounced edges on the peripheral portions of the magnetic layers as shown in FIGS. 1A and 1B, and 2A and 2B. The edges are configured as approximately right angles as illustrated in these figures, due to their manufacturing techniques. When the recorded information is read from the above described magnetic card, those end portions 3 or 23 come into contact with guide parts of the magnetic head or the magnetic card transport system. Such contact tends to damage those portions of the magnetic layer to cause misalignment or ineffective contact between the magnetic head and the magnetic layer; therefore, the information read out from the card is most likely to be in error.

SUMMARY OF THE INVENTION

It is therefore an object of this invention to provide a magnetic card, in which deterioration of the magnetic recording areas is minimized.

In accordance with the teachings of this invention, there is provided a magnetic card comprised of a substrate upon which a magnetic layer is formed. The peripheral or end portions of the magnetic layer are confined as inclined or curved surface, tending to prevent damage to the magnetic layer when information is written or read out therefrom.

BRIEF DESCRIPTION OF THE DRAWINGS

This invention will be more fully described in conjunction with the drawings, which include.

DETAILED DESCRIPTION OF THE PREFERRED EMBODIMENTS

Figure 3A:
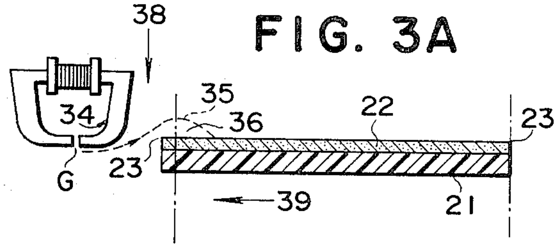
FIGS. 3A and 3C indicate the relative position between a magnetic head and a magnetic card in the cases of writing in or reading out information from magnetic cards, respectively.

In order to fully understand the characteristics of this invention, the mechanisms of writing in and reading out information from magnetic cards will be explained. FIG. 3A indicates a fundamental mechanism of a running system of writing in and reading out information onto and from a magnetic card.

Figure 2A:
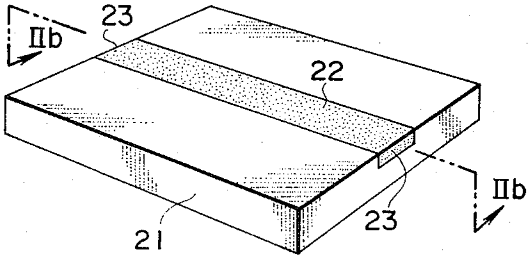
FIG. 2A PRIOR ART
FIGS. 2A and 2B show a perspective view and a cross-sectional view taken along line II*b*—II-*b* of FIG. 2A, respectively, of another magnetic card of the prior art.
Figure 2B:
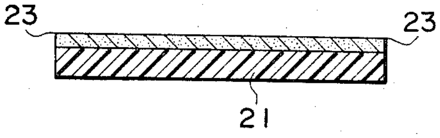
FIG. 2B PRIOR ART

In FIG. 3A, the symbols of FIG. 2 are used to identify corresponding portions of a magnetic card. When the surface of magnetic strip 22 and a magnetic head 34 having a gap spacing G are confronted, the magnetic head 34 is resiliently biased in the direction of an arrow 38, and is disposed with the gap G adjacent to the surface of the magnetic strip 22. This biasing force is selected typically to be in the range of 100 to 300g with gap line pressure at the head width of about one-quarter inch.

The magnetic card is transported in the direction of an arrow 39 with a substantially constant velocity (illustratively, 4.75 cm/sec, or 9.05 cm/sec). The magnetic card is disposed between endless belts which drive the card, or is motivated by a pinch roller or a capstan. As the card is moved past the magnetic head, the writing in and reading out of information is carried out.

Figure 3B:
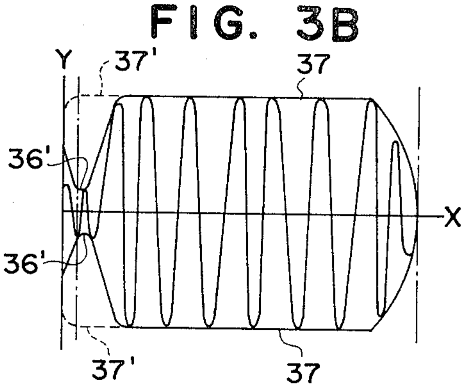
FIG. 3B represents the envelope of the output signal read from the magnetic card of FIGS. A and C.
Figure 3C:
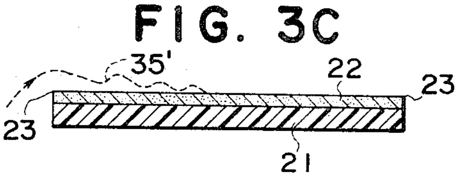

In FIG. 3, when the end portion 23 which has the approximate configuration of a right angle, begins to contact with a magnetic head 38, the magnetic head 38 will come into normal contact with the surface of magnetic strip 23 only after performing a "jumping" movement. In the simplest case, the gap G of the magnetic head 34 moves up and down in a decreasing sinusoidal motion indicated as a dotted line 35 in FIG. 3A. As a result, the gap G of the magnetic head 34 is moved away from the magnetic strip 22, leaving temporarily that part in the vicinity 36 of the end portion of the magnetic strip 22. Especially in an extreme case, the contact between the gap G of the magnetic head 34 and the magnetic strip 22 becomes non-uniform, whereby the head 34 travels in an asymptotic damped path as indicated with a dotted line 35′ in FIG. 3C.

FIG. 3B shows an envelope of the output signal of the magnetic head 34 as it moves along the path 35 over the card, as observed with an oscilloscope. In FIG. 3B, the X-axis represents time and the Y-axis indicates the amplitude of the head output signal. As the magnetic head gap G follows the sinusoidal locus of the dotted line 35 in FIG. 3A, the envelope of the output signal assumes the curve as indicated with a solid line 37. Where the magnetic head 34 leaves the surface of the magnetic card, the output signal therefrom decreases as indicated by numeral 36′. The curve of FIG. 3C indicates the effective record area of the magnetic strip 22 is diminished.

Figure 4:
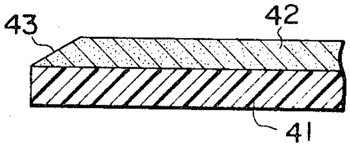
FIGS. 4, 5 and 6 show respectively views of three illustrative magnetic cards in accordance with the teachings of this invention.
Figure 5:
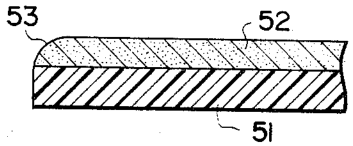

In accordance with the teachings of this invention, there is shown in FIG. 4 a magnetic card having a substrate 41 and a layer 42 formed thereon, made of a magnetic recording substance. Significantly, the end or peripheral portion of the layer (or strip) 42 is formed as an inclined plane or surface as indicated by the numeral 43 in FIG. 4, or the curved surface 53 as shown in FIG. 5, so that the magnetic head is brought into contact with the card as it moves smoothly onto the magnetic strip. This improvement was observed in the course of experiments with these cards.

More specifically, when the end portions of magnetic strips 42 and 52 are configured as surfaces 43 and 53, the envelopes of output signals obtained by a magnetic head are made almost flat as shown by the dotted lines 37′ in FIG. 3B. As a result, the output signals may be held above the slicing level even if not entirely flat; thus, it becomes possible to utilize effectively almost the entire surface of the strip except for the edge portions.

With magnetic cards of the prior art, it was not possible to use about 6 mm of strip surface as measured from the end of the magnetic strip due to the loss of contact between the card and the head. Typically, at a card velocity of 9.05 cm/sec, the magnetic head gap line pressure was 150/6.25 mm width. However, as a result of this invention, it is possible to utilize effectively the entire surface of the strip except for an end portion of 1 to 1.5 mm by making the structure for the magnetic card as shown in FIGS. 4 and 5.

Figure 1A:
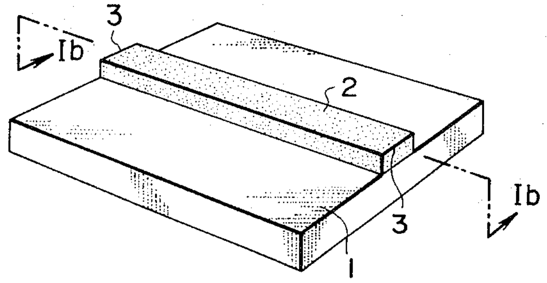
FIG. 1A PRIOR ART
FIGS. 1A and 1B show a perspective view and a cross-sectional view taken along line I*b*—I*b* of FIG. 1A, respectively, of a magnetic card of the prior art.
Figure 1B:
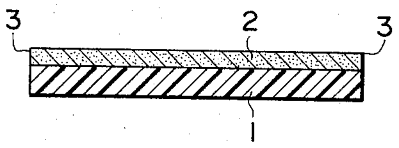
FIG. 1B PRIOR ART

The above noted adverse effects were observed in a magnetic card constructed from a magnetic strip on a substrate as indicated in FIG. 1, and also for the card in which the magnetic strip is buried in a groove of the substrate as indicated in FIG. 2. These adverse effects were also observed with a card having a magnetic layer disposed over the entire substrate surface.

Figure 6:
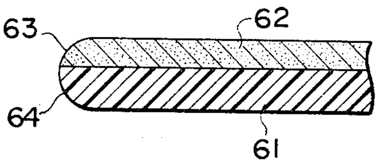

In a further embodiment of this invention as shown in FIG. 6, the magnetic card includes a substrate 61 and a magnetic layer 62. The substrate 61 and the magnetic layer 62 have end portions to facilitate card handling by a transport mechanism.

The following methods have been found effective to shape the end portions of the magnetic cards of FIGS. 4, 5 and 6: (1) the edge portion is shaped by press molding, and (2) the portion may be cut or ground. For example, a substrate made of a heat plastic substance such as vinylchloride, may be configured by placing the card to be shaped in a press mold which is formed with inclined planes or curved surfaces and is configured to the shapes of the end portion of the magnetic card. Next, the card may be subjected to pressure and heat of a temperature in the order of 65°C. The shaped end portions may be made by mechnical cutting regardless of the materials of the magnetic substrate. More specifically, the edges of the end portions of the magnetic card may be cut by suitable tools to make the inclined planes or curved surfaces.

As mentioned above, this invention relates to improvements of a magnetic card which is used in an information processing system, and has particular application to magnetic cards used in a mini-computer, a magnetic program, a desk electronic computer, etc.

Numerous changes may be made in the above-described apparatus and the different embodiments of the invention may be made without departing from the spirit thereof; therefore, it is intended that all matter contained in the foregoing description and in the accompanying drawings, shall be interpreted as illustrative and not in a limiting sense.

What is claimed is:

1. An information storage card adapted for transport by a card transport system in a path past a magnetic head comprising:

a substantially rectangular thin card substrate having parallel main plane surfaces, said card substrate having end portions adapted for transverse movement past said magnetic head, said end portions being disposed substantially perpendicular to the path;

a narrow groove in a main surface of said card substrate, said groove extending from a leading end portion along the said main surface of the card substrate to another end portion; and a magnetic layer in the form of a narrow strip of magnetic recording material buried in said groove extending between said end portions of said card substrate, said magnetic layer having an exposed surface disposed with said main plane surface of said card substrate, wherein the end portions of said card substrate and said magnetic layer are shaped as an inclined surface forming curved surface along peripheral edges of the end portions extending between the parallel main surfaces of the card substrate, thereby bringing smooth disposition and eliminating jumping movement of the magnetic head in contact with abruptly projecting edges on peripheral portions of the storage card.

2. An information storage card adapted for transport by a card transport system in a path past a magnetic head comprising:

a substantially rectangular thin card substrate having parallel main plane surfaces, said card substrate having end portions adapted for transverse movement past said magnetic head, said end portions being disposed substantially perpendicular to the path;

a narrow groove in a main surface of said card substrate, said groove extending from a leading end portion along the said main surface of the card substrate to another end portion; and a magnetic layer in the form of a narrow strip of magnetic recording material buried in said groove extending between said end portions of said card substrate, said magnetic layer having an exposed surface disposed with said main plane surface of said card substrate, wherein the end portions of said card substrate and said magnetic layer are shaped as an inclined surface forming a plane edge along peripheral edges of the end portions extending between the parallel main surfaces of the card substrate, thereby bringing smooth disposition and eliminating jumping movement of the magentic head in contact with pronounced edges on peripheral portions of the storage card, said inclined surface defining a plane edge transverse of a card path and forming an acute angle with respect to said parallel main plane surfaces.

* * * * *